United States Patent Office 3,363,120
Patented Jan. 9, 1968

3,363,120
MAGNETO-HYDRO-DYNAMIC GENERATOR EMPLOYING A FLUID AT A NON-UNIFORM TEMPERATURE
Pierre Ricateau, Garches, and Pierre Zettwoog, Massy, France, assignors to Commissariat à l'Energie Atomique, Paris, France
Filed Mar. 16, 1964, Ser. No. 352,203
Claims priority, application France, Mar. 29, 1963, 929,857
10 Claims. (Cl. 310—11)

ABSTRACT OF THE DISCLOSURE

A magneto-hydro-dynamic generator has a heating unit for the gas discharging into a gas temperature modulator which in turn discharges into the energy conversion unit. The modulator has a plurality of spaced and opposed electrodes sequentially supplied with electric current to heat the gas passing between the electrodes into relatively hot and cold zones.

---

The present invention relates to a type of apparatus of relatively recent conception which is designed to convert the mechanical energy of a fluid in motion into electrical energy, this type of apparatus being commonly known as a magneto-hydro-dynamic generator.

The principle of operation of this type of generator is simple. The fluid employed flows through a region in which a field of magnetic force is produced in a direction at right angles to that of the fluid motion whilst stationary electrodes which are placed in this region collect the current which is induced as a result of the action of the magnetic field on the fluid in motion in accordance with the laws of electromagnetism. It is impossible to make use of this device if the fluid employed is not electrically conductive either in the natural state or when made electrically conductive by artificial means. The invention is more especially concerned with those types of M.H.D. generators wherein the fluid is a gas which is brought to a high temperature and to which a thermodynamic cycle can be applied which transforms the thermal energy of said gas into mechanical energy which is in turn converted into electrical energy. This type of apparatus can be designated as an M.H.D. converter.

The construction of such converters sets a difficult problem as regards the maximum increase in electrical conductivity of the gaseous mixture which is employed. Taking into account the conditions of operation of these devices, it is found necessary to add to the gaseous mixture a small proportion of an alkaline element having a low ionization potential. Use is made, for example, of a gas which is formed by combustion of industrial hydrocarbons which are impregnated with potassium or one of its compounds, the molecular proportion being 1%. Helium impregnated with caesium can also be employed, the atomic proportion being also 1%.

These mixtures which are non-conductive at low temperatures become relatively conductive at high temperature as a result of the increasing ionization of the alkaline element. In addition, the electrical conductivity of the gas can be increased by the use of auxiliary ionization means such as the application of a continuous or high-frequency electric field or alternatively by irradiation with an electron beam. However, whatever may be the method employed and taking into account the conditions of operation of a converter, the gas must be brought to a high temperature of the order of 3,000° K. This requirement involves a number of serious difficulties in the design of converters as well as a limitation of their efficiency.

When the gas employed is heated as it passes through a combustion chamber, the requisite temperatures cannot be attained by employing fuels of usual type under economical conditions. If the gas is inert, the calorific power must be supplied by a heat exchanger, the construction of which sets awkward problems. The converter walls, the electrodes and other elements which are exposed to the gases must satisfy stringent conditions which are often contradictory and which are liable to deteriorate rapidly. Finally, the conversion of the mechanical energy of the gas into electrical energy is accompanied by a reduction in the enthalpy which must be strictly limited in order that the resulting fall of gas temperature does not bring about an excessive reduction in its conductivity; and this condition limits the efficiency of converters.

In an article published in the "Journal of the Institute of Fuel" 1960, No. 33, p. 293, Professor Thring has proposed a partial solution to the difficulties noted above. This consists in producing a variation in the gas temperature according to a substantially periodic law as a function of time at any point of the converter passage. Under these conditions, travelling temperature waves pass through the nozzle at the velocity of the gas. FIG. 1 illustrates in a substantially simplified manner the law of temperature distribution within the nozzle 1 in which there takes place the conversion of energy of an M.H.D. generator of improved design according to Professor Thring. There can be distinguished in said nozzle hot zones (shaded zones) AB, CD, EF, the temperature if which is higher than the mean temperature Θ of the gas and cold zones (unshaded zones) BC, DE, in which the temperature is lower than Θ. It should be noted that, for the purpose of simplification, the boundaries between zones have been assimilated with planes which are perpendicular to the axis of the nozzle. However, it will be apparent that, in actual fact, these boundaries are more or less deformed depending on the conditions of flow of the gas and that, in addition, said boundaries are often less sharply defined. It is further apparent that these zones travel at the same velocity as the gas.

This modulation of temperature is advantageous in view of the fact that, if the hot zones are maintained at very high temperatures, they permit the flow of current by reason of their excellent conductivity whereas the so-called cold zones are liable to lose a substantial proportion of their enthalpy in the form of electrical energy. Under these conditions, the mean apparent conductivity of the gas can be relatively high in spite of a substantial removal of heat content, the mean temperature being sufficiently low to avoid the above-mentioned disadvantages involved in the stringent temperature conditions to which the elements of an M.H.D. generator of conventional type are subjected.

The improved M.H.D. generators according to the Thring process comprise means for providing a pulsatory fuel delivery in conjuction with the unit in which the gases are brought to a high temperature by combustion. This method of modulation of the gas temperature often lacks flexibility, calls for the use of delicate components and is difficult to carry into effect.

The object of the present invention is to make use of means which are both simple, accurate, easy to operate and which assist the stability of operation so as to modulate the temperature of the gas which is employed in an M.H.D. converter.

A converter of this type in accordance with the invention is characterized in that it comprises, between the unit (combustion chamber, heat exchange) in which the gas employed is brought to a high temperature while also being made conductive and the inlet of the unit in which the conversion of energy takes place, a device for modulating the temperature of said gas by the electric heating, without arc formation, of a number if different regions creating within said gas relatively hot zones and relatively cold zones, the heating power being a small proportion of the power which is transported by the gas.

The device for modulating the gas temperature is further characterized in that it comprises an even number of electrodes, one-half of this number being arranged on each side of the path followed by the gas and uniformly spaced apart along said path. These electrodes are coupled to a direct-current voltage source through the intermediary of a commutator or to an alternating-current voltage source having a frequency $f$ which can be either single-phase or multi-phase, the distance $p$ between adjacent electrodes being so determined that, taking into account the frequency $\varphi$ of commutation of the direct-current source or the frequency $f$ of the alternating-current source, any one zone of the gas in motion is always subjected to an electric field having a substantially constant amplitude (as absolute value).

The alternating-current or direct-current voltage generator and the temperature-modulating device supplied by said generator are capable of carrying out a very substantial modulation of the conductivity of the gas. However, as an alternative form, it is possible to make use of a complex mdoulating unit consisting of two parts, the first part being similar to the modulator device which has already been described while the second part comprises two electrodes which are located on each side of the path of the gas and is supplied with direct-current voltage. Under these conditions, the second part of the modulator device can advantageously be supplied either from a direct-current generator or from the converter unit of the M.H.D. generator.

In a generator in accordance with the invention, the electrically conductive gas which is derived from the modulator has a modulated temperature inasmuch as those zones of said gas which are subjected to a strong electric field (as shown at AB in FIG. 1) have been heated by Joule effect whereas those zones which have been subjected to a weak or zero electric field (as shown at BC) have not been heated at all or much less so. One of the advantages of the invention lies in the fact that the amplitude of the temperature modulation can be relatively small and is represented, for example, by a maximum difference of 100° C. at a mean temperature of 2,700° C. On account of the nonlinear relation between conductivity and temperature, the rate of modulation of the conductivity is approximately equal to 10 times the depth of modulation of the temperature. It accordingly follows as a result that, if the gas is then subjected to a uniform electric field within the converter unit, the Joule losses will be greater in the zones AB than in the zones BC. The temperature difference between the two types of zones will accordingly have a tendency to increase, thus rapidly giving rise to a runaway condition, the zones AB being the only zones to be heated while the zones BC receive practically no heat.

This selective heating effect is turned to profitable account in the conversion unit. Taking into account the Joule losses which are inevitable in said conversion unit, it is in fact possible to endow the nozzle with a profile which is so designed that the hot zones AB are maintained after expansion at a high temperature of the order of 3,000° K. which ensures a sufficient average conductivity. The same result can be obtained by determining the law of extraction of electric power along said nozzle.

In other words, it is known that, in any magneto-hydrodynamic device, electrical losses occur especially where the conductivity is highest thereby increasing the temperature. Since this process produces a further increase in conductivity, it is therefore merely necessary in order to obtain the desired differentiation of the hot gas stream into conductive zones and non-conductive zones to modulate to a relatively small extent the temperature of the entry gas without actually striking an arc.

The calculation of the efficiency of the converter must of course take into account the electrical energy which is consumed by the modulator. It is revealed that the electrical energy consumed for the purpose of modulating the gas temperature is small compared with the energy which is transported by the gas. Moreover, the energy increase which is permitted in a nozzle of given volume is very much higher than the energy loss which is permitted in the modulation process.

One of the advantages of the complex modulator which is employed in accordance with an alternative form of the invention arises from the fact that, since the power supplied to the second part of said modulator is preferably from a direct-current source, it is convenient to make use of the M.H.D. conversion unit itself.

Aside from these main arrangements, the present invention consists in certain secondary arrangements which will be discussed below and which relate in particular to the connection of the modulator electrodes to the current supply source.

In order that the advantages and characteristic features of the present invention may become more readily apparent, there will now be described below a number of forms of embodiment of the modulator, it being understood that said forms of embodiment are not given in any sense by way of limitation as regards the design arrangements which can be adopted and practical applications to which the invention may be directed.

Figure 2:
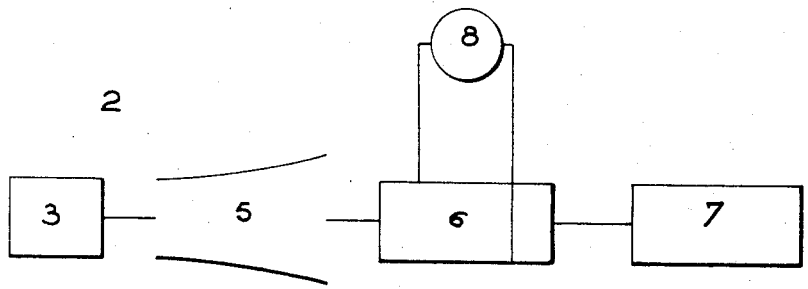
FIG. 2 represents an M.H.D. converter in accordance with the invention.

In the M.H.D. generator 2 of FIG. 2, a gas is circulated in a thermodynamic cycle so as to transform the heat energy of said gas into mechanical energy which is then converted into electrical energy.

Figure 1:
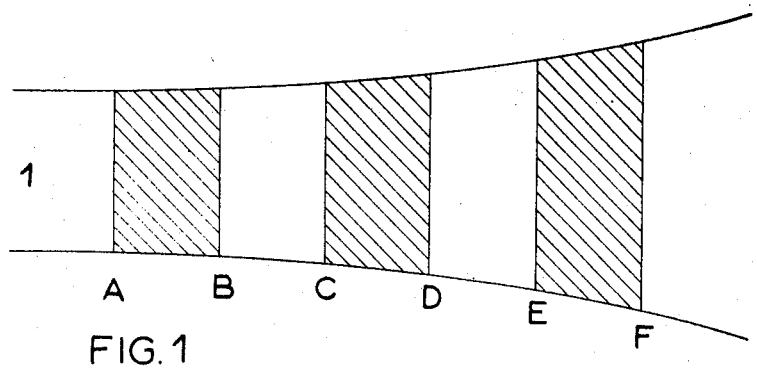
FIG. 1 is a simplified graphic representation of the temperature distribution within the nozzle proposed by Professor Thring.

The gas which is supplied from a hot source 3 and brought to a high temperature within the combustion chamber 5 in the form of a nozzle is directed into a temperature-modulating device 6 in accordance with the present invention. After passing through the modulator, the gas comprises zones wherein the temperature is alternately relatively high and relatively low. These zones are distributed in accordance with the diagram of FIG. 1 which has already been described. The gas which passes out of the modulator is directed into the converter unit 7. The electrodes of the modulator are connected to the terminals of a voltage generator 8 which supplies the modulation energy. Said generator produces an alternating-current voltage having a suitable frequency or else produces a direct-current voltage; in this latter case, the generator is associated with a commutator. The electrodes must be connected to the generator in such a manner as to establish within the modulator passage electric-field waves which travel in the direction of motion of the gas and which have the same velocity as the gas. This necessitates a relation between the alternator frequency, the spacing between the electrode centers or pitch and the velocity of the gas. If the gas velocity varies between the input and output of the device, the pitch must therefore also be variable in such a manner as to ensure that this relation is maintained at all points. The expression "travelling electric-field wave" has been employed by analogy with the expression "magnetomotive force wave" which is employed in the study of the operation of rotating machines of the alternating-current type. This analogy gives a clearer conception of the principle of synchronism but it is apparent that the electric-field wave is likely to come close to sinusoidal shape only in the case of a device which is connected to a polyphase generator having a large number of phases and a narrow passageway. In the majority of cases, the distribution of the electric field will not be sinusoidal but it will always be possible to ensure that the gas sections of type AB of FIG. 1 pass in front of the successive electrodes at the moment when the electric field is strong and that the sections BC pass in front at the moment when the electric field is either zero or weak. This extension of the principle of synchronism remains valid even in the case of power supply by single-phase generator or by direct-current generator with commutator, and produces a relation between the frequency, the pitch of the electrodes and the velocity of the gas in the same manner as the consideration of travelling waves. In order to generate these travelling waves, a large number of processes can be devised which make use of generators whether accompanied or not by rectifiers. FIGS. 3, 4, 5 and 6 show the modes of connection in the case of four modulators.

Figure 3:
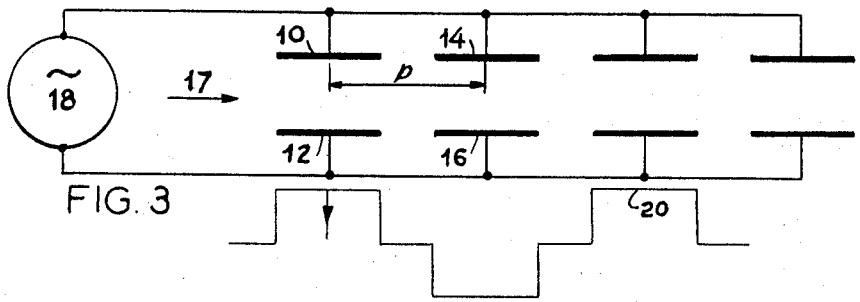
FIGS. 3 to 6 are respectively diagrams of four modulators which are designed to equip the M.H.D. converter of FIG. 2, there being shown in these figures the modes of connection of the modulator electrodes which single-phase or three-phase alternators, these connection being effected either directly or through the intermediary of rectifiers.

The modulator unit of FIG. 3 comprises four pairs of electrodes 10–12, 14–16 . . . which are disposed on each side of the path followed by the gas flow (as shown by the arrow 17) and which are uniformly spaced apart along the axis of said modulator. The group of electrodes 10–14, etc. . . . as well as the group of electrodes 12–16 . . . are connected to the two terminals of a single-phase alternator 18 having a frequency $f$. The spacing $p$ between electrodes is made dependent on the velocity $v$ of the gas and on the frequency $f$ by the relation $$p = \frac{v}{2f}$$

in such manner that a same zone of gas passes between the successive pairs of electrodes whereas the electric field which is created has substantially the same amplitude in absolute value.

The curve 20 represents the electric field in the modulator when the voltage produced by the alternator 18 is at maximum amplitude (as absolute value). The modulator is intended to permit the creation of hot zones and cold zones such that the sum of their width is $L_C + L_F = p$.

Figure 4:
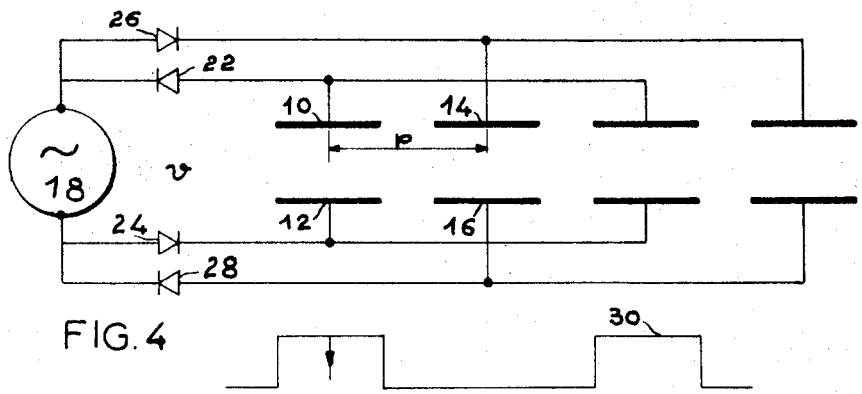

The modulator of FIG. 4 is similar to that of FIG. 3 and similar elements in both figures are designated by the same reference numerals. The electrodes are coupled to the terminals of the alternator by means of rectifiers 22, 24, 26, 28. Employing the same notations as heretofore, we must again have the relation $v = 2fp$.

The curve 30 represents the electric field in the modulator when the rectifiers 22–24 are conductive and when the amplitude of this field as absolute value is maximum. The modulator makes it possible to create hot zones and cold zones such that $L_C + L_F = 2p$.

Figure 5:
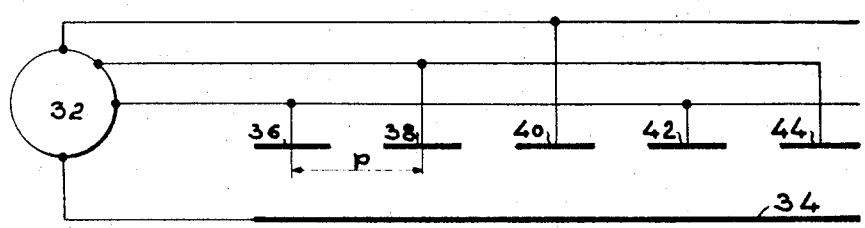

In the case of the modulator of FIG. 5, the voltage source is a star-connected three-phase alternator 32 having a frequency $f$ whilst on one side of the gas-flow path, there has been placed a single electrode 34 which is connected to the neutral point of the alternator; the electrodes 36, 38, 40, 42 and 44 which are disposed on the other side of said flow path are connected in sequence along said path to the different phases of the alternator. Using the established notations, we must have the relation $v = 3fp$ and $L_C + L_F = 3p$.

Figure 6:
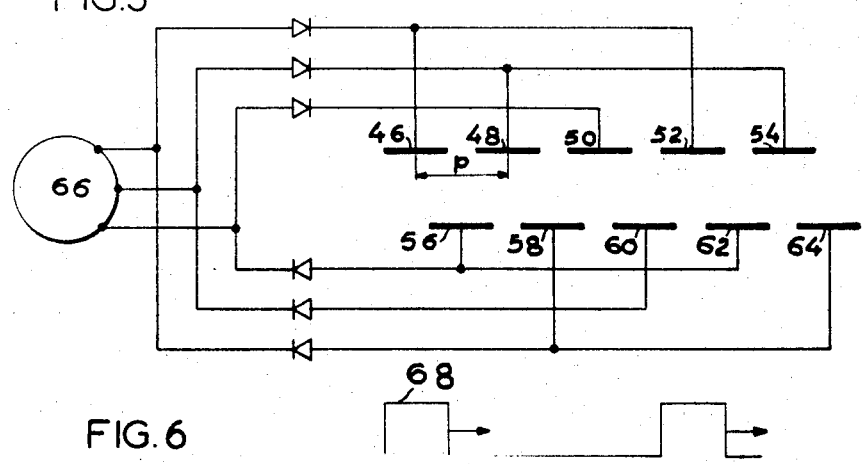

The modulator of FIG. 6 comprises electrodes 46, 48, 50, 52 and 54 on one side of the gas-flow path and electrodes 56, 58, 60, 62 and 64 on the other side of said path. It will be noticed that the electrodes of the second group are displaced by one half interval between group electrodes with respect to those of the first group. The said electrodes are connected in their proper sequence through rectifiers to the phases of a delta-connected three-phase alternator 66 having a frequency $f$. We again have the relation $v = 3fp$ and $L_C + L_F = 3p$. The curve 68 shows the electric field in the modulator when the rectifier which is connected to the electrodes 46 and 52 is conductive.

Figures 7, 8:
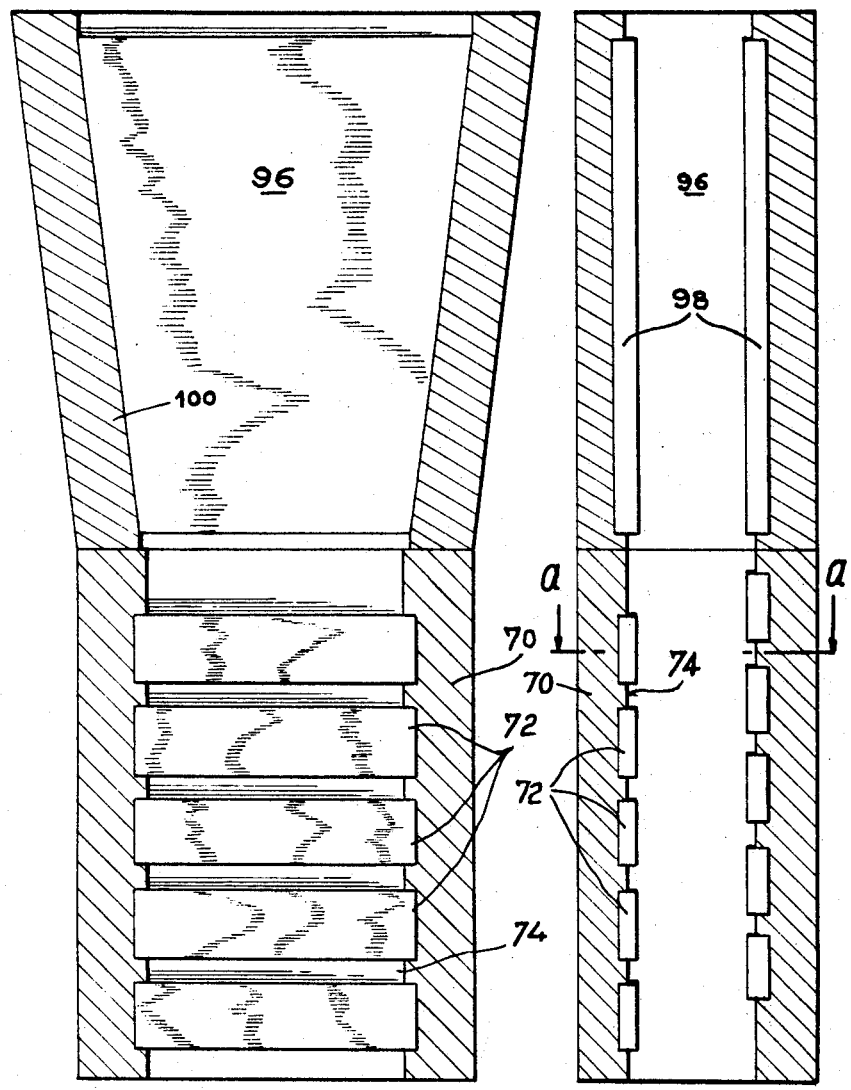
FIGS. 7 and 8 are sectional views taken along longitudinal and perpendicular axial planes of a modulator which comprises two essential parts.
Figure 9:
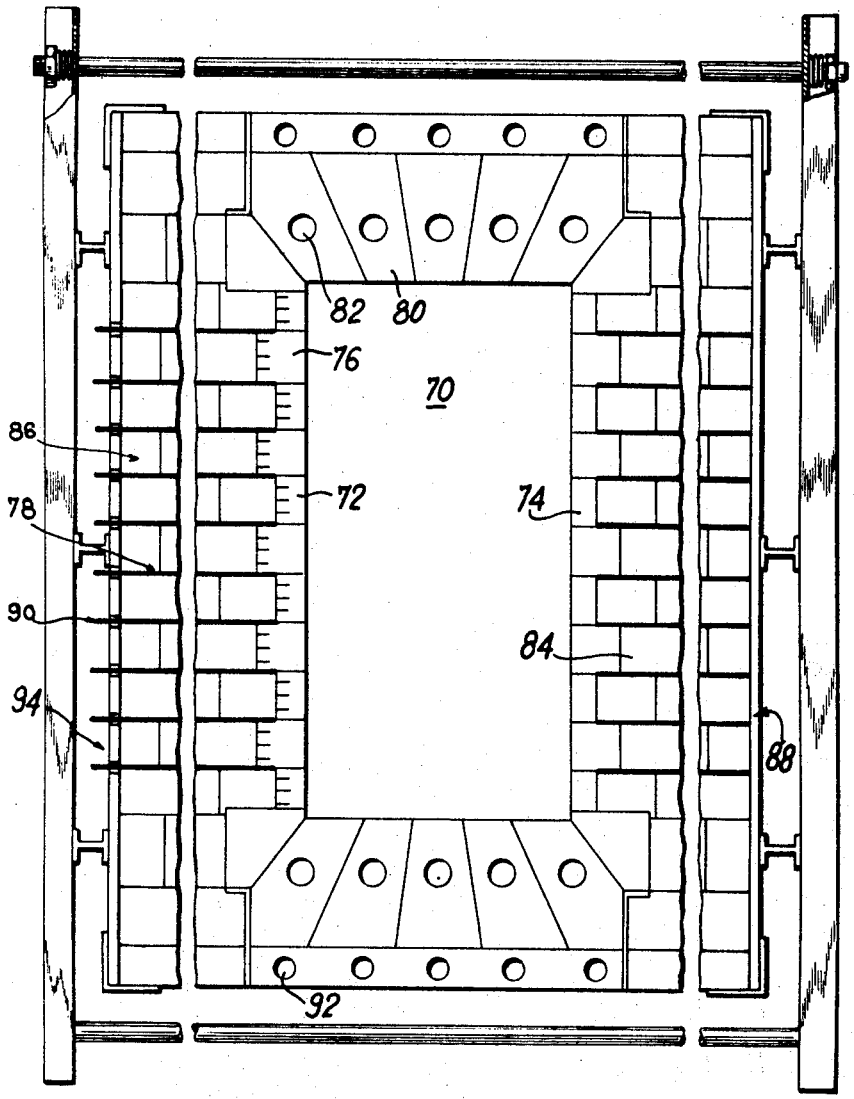
FIG. 9 is a transverse sectional view of the modulator of FIGS. 7 and 8 taken along the line $a-a$ of FIG. 7.

There will now be described a modulator as shown in FIGS. 7, 8 and 9 in accordance with an alternative form of the invention which operates with the combustion gases of kerosene.

In the first stage, the gases circulate in a rectangular passage 70. Said passage has a constant cross-section. The walls of the long side carry electrodes 72 which take up the full height of the passage and which are separated from each other by spacer members 74 which are not electrically conductive. The arrangement for the production of the electric field is that of FIG. 6. Those electrodes which are located on one face are displaced relatively to the opposite electrodes in such a manner as to propagate a voltage wave from the upstream end to the downstream end at the velocity of the gas when said electrodes are supplied from an alternating-current source having a suitable frequency. The electrodes 72 can be plates of zirconia brought by contact with the gas to a temperature of the order of 2,200° K. Current collectors which establish an electrical connection between said zirconia plates and the supply cable; said collectors can comprise a sheet or foil 76 of refractory metal (as shown in FIG. 9) which is deposited by projection on the rear face of the zirconia which is provided or not with indentations which ensure the anchoring of this metal in the refractory material. A connection 78 of the same metal joins said foil to the supply terminal. The spacer members 74 between the electrodes can be constituted by a stack of small plates of zirconia, the plane of which would be at right angles to the axis of the stream, this structure having the effect of lowering the electrical conductivity at right angles to the foliation. It will be noted that, in addition, the current-supply rectifiers (FIG. 6) prevent any flow of current between electrodes of a same face and that a fairly wide tolerance is thus permitted in the quality of insulation of the spacer members.

The passage is delimited on the two other faces thereof by bricks 80 of zirconia which are made insulating by a more powerful cooling which is obtained, for example, by means of a circulation of air (conduits 82) which will be employed as oxidizer. It will be merely necessary to ensure that these walls are maintained at approximately 1,600° K. in order that their resistivity should remain satisfactory.

The diffusion of heat will on the contrary be prevented behind the electrodes by making provision for a heat-insulating layer which is made up, for example, of bricks 84 of sillimanite having a high degree of porosity which are backed-up against insulating bricks 86. The thickness of these bricks will be adjusted so as to maintain the rear faces of the electrodes at a temperature of the order of 1,800° K.

The complete device of the first stage is placed within a metallic vessel 88 of stainless steel which is pierced with leak-tight openings 90 for the insertion of the current-supply leads. The casing can be cooled by water circulation ducts 92 and by external ventilation means 94. A suitable assembly of structural shapes serves to hold the brick structure in position.

The second stage 96 of the modulator (as shown in FIG. 7) is designed in a similar manner except that it has a variable cross-section from the downstream end to the upstream end. The electrodes 98 occupy the full length of the trapezoidal faces without insulating spacer members. Said electrodes are made up of juxtaposed and equipotential pieces of zirconia and are fitted with collectors according to a technique which is identical with the method employed in the case of the electrodes of the first stage. In addition, the said electrodes are heat-insulated by means of a backing layer of high-porosity sillimanite bricks which are backed-up against insulating bricks. Similarly, the insulating walls 100 are zirconia bricks which are cooled by an internal circulation of air. The combined assembly is contained in a leak-tight steel vessel of a design which is identical with the preceding.

Each vessel of the modulator is provided on the upstream face and downstream face thereof with coupling flanges for the purpose of securing the vessels to each other as well as to the burner and converter chambers.

Having thus briefly described a modulation nozzle in accordance with the invention, it remains to be emphasized that the problems encountered in connection with structural design and the use of materials are the same as those which are met with in M.H.D. converters of conventional type. However, the conditions imposed by the temperature of the gas are less stringent by virtue of the application of the temperature modulation process.

The materials and structural arrangements which are suitable for an M.H.D. generator of ordinary design are all the more suitable in the case of the modulation unit which has just been described.

There will now be specified below the main characteristics of the devices employed as well as the gas-flow characteristics.

(A) Characteristics of the alternator which supplies the first stage:

| | | |
|---|---|---|
| Power | mw | 61 |
| Frequency | c.p.s. | 1,000 |
| Peak voltage | v | 3,500 |

The wavelength $L_C + L_F$ of the temperature wave produced by means of the alternator is one meter, the relative temperature increase at the output of the first stage is 10%.

(B) Characteristics of the direct-current supply to the second stage:

| | | |
|---|---|---|
| Power | mw | 250 |
| Voltage | v | 1,350 |

The above-noted voltage of 1,350 volts is impressed across the terminals of the M.H.D. converter itself. The increase in cross-section in this stage makes its possible to maintain constant the pressure, velocity and temperature of the gas zones which remain cold.

| | °K. |
|---|---|
| Temperatures of the cold zones (second stage output) | 2,600 |
| Temperatures of the hot zones (second stage output) | 3,200 |

(C) Flow characteristics:

| | | |
|---|---|---|
| Flow rate | kg./sec. | 515 |
| Thermal power | mw | 2,840 |

Conditions after combustion:

| | | |
|---|---|---|
| Pressure | atmospheres | 20 |
| Temperature | °K | 2,750 |
| Enthalpy 1,150 kcal./kg. | mj./kg. | 4.8 |
| Pressure | atmospheres | 10 |

Conditions after isentropic expansion (modulator input):

| | | |
|---|---|---|
| Temperature | °K | 2,540 |
| Enthalpy | kcal./kg. | 1,030 |
| Velocity | m./s. | 1,000 |

Conditions after modulation (M.H.D. converter input):

| | | |
|---|---|---|
| Pressure | atmospheres | 10 |
| Hot zone temperatures | °K | 3,200 |
| Cold zone temperatures | °K | 2,600 |
| Enthalpy | mj./kg. | 4.85 |
| Total enthalpy | mj./kg. | 5.35 |
| Velocity | m./s. | 1,000 |
| Apparent conductivity | Mho/meter | 30 |

By way of indication, and in order to demonstrate the value of said invention, the characteristics of the M.H.D. converter which is associated with said modulator will now be specified hereunder. (It will be recalled that the temperature of 2,750° K. at 20 atmos. after combustion can be obtained without oxygen-enrichment from air which is preheated to 1,100° K.)

Constant magnetic-field density of 4 W.B./m²

Load factor K ($K = \frac{\text{electric power extracted}}{\text{internal power}}$, equivalent to 0.8)

| | | |
|---|---|---|
| Enthalpy efficiency | percent | 28 |
| Overall efficiency | do | 15 |
| Specific power (input rating) | mw./m.³ | 77 |
| Specific power (output rating) | do | 23 |
| Length of M.H.D. nozzle | meters | 10 to 15 |
| Electric power available at main supply source | mw | 300 |

The overall efficiency is calculated after deduction of the power which is necessary for the compression of the electric power which is dissipated in the two stages of the modulator and of the kinetic energy which is retained by the gases at the outlet.

What is claimed is:

1. Magneto-hydro-dynamic generator comprising an output unit heating the gas to a high temperature and conductivity, a unit for conversion of energy, an inlet for said unit and a device for modulating the temperature of said gas by electric heating by capacity losses coupling said output unit and said inlet of said conversion unit, said device having a plurality of different regions creating within said gas relatively hot zones and relatively cold zones, the power supplied as a result of heating said gas being a small proportion of the power transported by said gas.

2. Magneto-hydro-dynamic generator as described in claim 1, said device for modulating the gas temperature consisting of an even number of identical electrodes, one-half of said number being disposed and uniformly spaced on each side of the path followed by said gas.

3. Magneto-hydro-dynamic generator as described in claim 2 including a direct current source and a commutator, the distance $p$ between adjacent electrodes being equal to one-half the distance between adjacent zones in said gas of maximum or minimum temperature, any one portion of said gas in motion being constantly subjected to an electric field having a substantially constant amplitude as absolute value.

4. Magneto-hydro-dynamic generator as described in claim 2, said electrodes being connected to a single phase alternating current source, the distance $p$ between adjacent electrodes being equal to one-half the distance between two closely adjacent zones in said gas of maximum or minimum temperature in view of the frequency $f$ of said source.

5. Magneto-hydro-dynamic generator as described in claim 2, said electrodes being connected to a polyphase alternating current source, the distance $p$ between adjacent electrodes being equal to $D/n$ where $D$ is the distance between two closely adjacent zones in said gas of maximum temperature and $n$ is the number of phases of said source.

6. Magneto-hydro-dynamic generator as described in claim 2, said device for modulating the gas temperature comprising $2n$ oppositely facing electrodes.

7. Magneto-hydro-dynamic generator as described in claim 6 including means for connecting said electrodes on each side of the gas flow path respectively to one of two terminals of a single phase alternator having a frequency $f$, the distance $p$ between said electrodes being equal to $v/2f$ where $v$ is the velocity of said gas.

8. Magneto-hydro-dynamic generator as described in claim 6, said electrodes located on one side of the gas flow path being connected to the neutral point of a star-connected three phase alternator having a frequency $f$, said electrodes on the other side of the gas flow path in the order $1+3\alpha$, $2+3\alpha$, $3+3\alpha$ (alpha=0.1, 2) being respectively connected to the three phases of said alternator, the distance $p$ between electrodes being equal to $v/3f$ where $v$ is the velocity of said gas.

9. Magneto-hydro-dynamic generator as described in claim 6, said $2n$ electrodes being set at intervals on each side of the gas flow path, said electrodes on one side of the gas flow path being displaced by an interval $p/2$ where $p$ is the distance between adjacent electrodes relatively to said electrodes on the other side of the gas flow path, said electrodes disposed in sequence $1+3\alpha$, $2+3\alpha$, $3+3\alpha$ (alpha=0.1, 2) on one side of the gas flow path being connected to phases 1, 2 and 3 of a delta-connected three-phase alternator having a frequency $f$, said electrodes disposed in the sequence $2+2\alpha$, $2+3\alpha$, $3+3\alpha$ and $1+3\alpha$, on the other side of the gas flow path also being connected to said phases, the distance between adjacent electrodes being $v/3f$.

10. Magneto-hydro-dynamic generator as described in claim 1, said temperature modulating device comprising two units, the first of said units including an even number of identical equally spaced electrodes connected to an alternating current source with one-half of said number disposed on each side of the gas flow path and the second of said units comprising two electrodes supplied with a direct current voltage, one on each side of the gas flow path.

References Cited
UNITED STATES PATENTS

| | | | |
|---|---|---|---|
| 3,127,528 | 3/1964 | Lary et al. | 310—11 |
| 3,201,622 | 8/1965 | Thring | 310—11 |

DAVID X. SLINEY, *Primary Examiner.*